US010063912B2

(12) United States Patent
Hartley et al.

(10) Patent No.: US 10,063,912 B2
(45) Date of Patent: Aug. 28, 2018

(54) ADAPTIVE TRANSCODING BYPASS SYSTEM

(71) Applicant: Broadcom Corporation, Irvine, CA (US)

(72) Inventors: Steven Hartley, Pointe-Claire (CA); Fabian Alberto Russo, Trabuco Canyon, CA (US); James F. Dougherty, Morgan Hill, CA (US); Stephen Ray Palm, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 359 days.

(21) Appl. No.: 14/636,057

(22) Filed: Mar. 2, 2015

(65) Prior Publication Data
US 2015/0249859 A1 Sep. 3, 2015

Related U.S. Application Data

(60) Provisional application No. 61/946,667, filed on Feb. 28, 2014.

(51) Int. Cl.
H04N 21/4363 (2011.01)
H04N 21/41 (2011.01)
(Continued)

(52) U.S. Cl.
CPC ..... *H04N 21/4363* (2013.01); *H04L 65/1083* (2013.01); *H04L 65/605* (2013.01);
(Continued)

(58) Field of Classification Search
CPC ... H04L 65/1083; H04L 65/605; H04L 65/80; H04L 67/303; H04L 67/34;
(Continued)

(56) References Cited

U.S. PATENT DOCUMENTS 8,995,534 B2 * 3/2015 Richardson ............ H04N 19/70
375/240.25
2005/0207442 A1 * 9/2005 Zoest ............... G11B 20/00086
370/465

(Continued)

*Primary Examiner* — William C Vaughn, Jr.
*Assistant Examiner* — Naod Belai
(74) *Attorney, Agent, or Firm* — McDermott Will & Emery LLP

(57) ABSTRACT

The subject system allows a source device providing a content stream over a network connection to a sink device to adaptively bypass a transcoding portion of a content processing pipeline when the original content stream, e.g. the non-transcoded content stream, can be decoded by the sink device and/or when no actions that utilize transcoding have been requested for the content stream. The source device may power down the transcoding portion of the content processing pipeline when the transcoding portion is not in use. When an action that utilizes transcoding is requested, and the transcoding portion of the pipeline is being bypassed, the source device may power on the transcoding portion and adaptively modify the pipeline to pass the content stream through the transcoding portion. The source device may provide configuration messages to the sink device when the pipeline is modified to provide information for decoding the transcoded content stream.

19 Claims, 5 Drawing Sheets

(51) Int. Cl.
 *H04N 21/4402* (2011.01)
 *H04N 21/2343* (2011.01)
 *H04L 29/06* (2006.01)
 *H04L 29/08* (2006.01)

(52) U.S. Cl.
 CPC ............ *H04L 65/80* (2013.01); *H04L 67/303* (2013.01); *H04L 67/34* (2013.01); *H04N 21/234309* (2013.01); *H04N 21/4126* (2013.01); *H04N 21/440218* (2013.01)

(58) Field of Classification Search
 CPC ....... H04N 21/234309; H04N 21/4126; H04N 21/4363; H04N 21/440218
 USPC ..................................... 375/240.02
 See application file for complete search history.

(56) References Cited

U.S. PATENT DOCUMENTS

| | | | | |
|---|---|---|---|---|
| 2006/0119536 A1* | 6/2006 | Yoshida | ............... | H04N 19/139 345/1.1 |
| 2009/0164652 A1* | 6/2009 | Slobotskoy | ............ | H04N 5/783 709/231 |
| 2012/0191805 A1* | 7/2012 | Fee | .................... | H04N 21/2343 709/217 |
| 2013/0291011 A1* | 10/2013 | Shin | ....................... | H04N 21/81 725/32 |
| 2015/0023648 A1* | 1/2015 | Sheth | .................... | H04N 5/775 386/230 |

* cited by examiner

ADAPTIVE TRANSCODING BYPASS SYSTEM

CROSS-REFERENCE TO RELATED APPLICATIONS

The present application claims the benefit of U.S. Provisional Patent Application Ser. No. 61/946,667, entitled "Audio-Video Streaming," filed on Feb. 28, 2014, which is hereby incorporated by reference in its entirety for all purposes.

TECHNICAL FIELD

The present description relates generally to adaptively bypassing transcoding, including adaptively bypassing transcoding in a wireless audio and/or video streaming system.

BACKGROUND

Peer-to-peer wireless screencasting technologies allow a source device to form a wireless connection with a display device, which may be referred to as a sink device. The source device delivers audio and/or video streams to the display device over the wireless connection for presentation to a user. For example, a user may echo a display from a phone, tablet, or other computing device onto a television.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system allows an electronic device providing a content stream to a display device, such as a sink device, to adaptively bypass a transcoding portion of a content processing pipeline when the original content stream, e.g. the non-transcoded content stream, can be directly decoded by the sink device and/or when no actions that utilize transcoding have been requested with respect to the content stream. The electronic device may power down the transcoding portion of the content processing pipeline when the transcoding portion is not in use to conserve power. When an action that utilizes transcoding is requested, and the transcoding portion of the pipeline is being bypassed, the electronic device may power on the transcoding portion and adaptively modify the pipeline to pass the content stream through the transcoding portion. In one or more implementations, an action that utilizes transcoding includes a request to perform a trick mode, a request to display an overlay, such as a guide or a menu, and/or a request to provide a lower or higher quality content stream. The electronic device may provide configuration messages to the sink device to indicate changes in the encoding of the content stream, such as when the pipeline is modified to bypass, or pass through, the transcoding portion.

Figure 1:
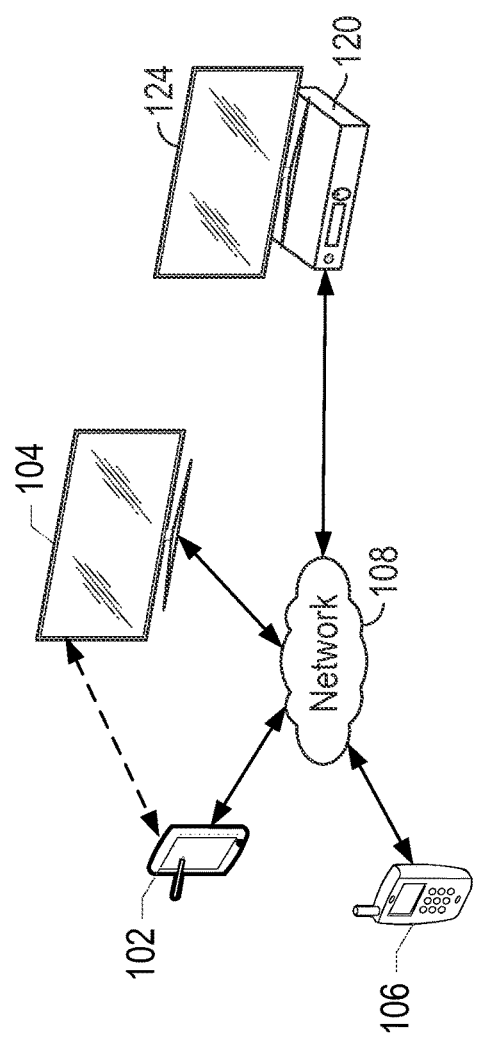
FIG. 1 illustrates an example network environment in which an adaptive transcoding bypass system may be implemented in accordance with one or more implementations.

FIG. 1 illustrates an example network environment 100 in which an adaptive transcoding bypass system may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more electronic devices 102, 104, 106 and a set-top box device 120 that are communicably coupled to a network 108. The network 108 may include one or more wired and/or wireless network devices, such as wireless access devices, routers, switches, etc. that may facilitate communication between the electronic devices 102, 104, 106, and/or the set-top box device 120. In one or more implementations, the network 108 includes wired Ethernet devices, MoCA devices, HomePlug devices, and the like.

The set-top box device 120 may be coupled to, and capable of presenting video content on, an output device 124, such as a television, a monitor, speakers, or any device capable of presenting video and/or audio content. In one or more implementations, the set-top box device 120 may be integrated into the output device 124. In one or more implementations, the set-top box device 120 may communicatively couple the electronic devices 102, 104, 106 to an external network, such as the Internet. One or more of the electronic devices 102, 104, 106, the set-top box device 120 and/or the output device 124 may be and/or may include all or part of the electronic system discussed below with respect to FIG. 5.

The electronic devices 102, 104, 106 can be computing devices such as laptop or desktop computers, smartphones, set-top boxes, peripheral devices, user input devices, tablets, televisions or other displays with one or more processors coupled thereto and/or embedded therein, or other appropriate computing devices that can be used for encoding, transmitting, receiving, decoding, and/or presenting audio streams and/or video streams, and/or can be coupled to such a device. In the example of FIG. 1, the electronic device 102 is depicted as a tablet device, the electronic device 104 is depicted as a television, and the electronic device 106, is depicted as a smart phone. In one or more implementations, the electronic device 104 that is depicted as a television may receive audio and/or video streams, decode the streams, and present the decoded streams to a user.

The electronic devices 102, 104, 106, and/or the set-top box device 120 may include appropriate network interfaces for establishing infrastructure network connections, and/or direct, e.g. peer-to-peer, network connections, such as Wi-Fi Direct connections, Bluetooth connections, Zigbee connections, or generally any direct network connections. In one or more implementations, any of the electronic devices 102, 104, 106, the set-top box device 120 and/or the output device 124 may establish a network connection with another of the electronic devices 102, 104, 106, the set-top box device 120 and/or the output device 124.

In one or more implementations, one or more of the electronic devices 102, 106, and/or the set-top box device 120, such as the electronic device 102, establishes a network connection with the electronic device 104, such as a peer-to-peer network connection and/or an infrastructure network connection. The electronic devices 102, 104 utilize the established network connection to facilitate one or more services. For example, the electronic device 102 may transmit audio and/or video streams over the network connection to the electronic device 104, and/or to a device coupled to the electronic device 104, such as an adapter, a dongle, etc. For explanatory purposes, an audio stream and/or video stream may be individually and collectively referred to as a content stream. The electronic device 104 receives the audio and/or video streams and presents the audio and/or video streams, e.g. to a user. In one or more implementations, the electronic device 102 that is transmitting the audio and/or video streams is referred to as a source device and the electronic device 104 that is receiving and presenting the audio and/or video streams is referred to as a sink device.

The electronic device 102 may also generate a user interface, encode the user interface into a video and/or audio stream, and provide the user interface to the electronic device 104. When a user interacts with the user interface presented by the electronic device 104, the electronic device 104 provides an indication of the user interaction to the electronic device 102 via a control channel, e.g. over the network connection. Various user interactions, such as fast forward, rewind, skip ahead, skip back, may be referred to as trick modes. The electronic device 102 updates the user interface in view of the user interactions, to provide for remote user interface functionality, and provides a video and/or audio stream containing the updated user interface to the electronic device 104. In one or more implementations, remote user interface functionality may be provided via Digital Living Network Alliance (DLNA) hypertext markup language 5 (HTML5) remote user interface (RUI), RVU remote user interface (RUI), Apple TV, and/or Miracast technologies.

In one or more implementations, the user interface, and/or other supplemental content, such as a visual and/or audio indication of a trick mode being performed and/or information pertaining a video stream being provided to the electronic device 104, may be combined with the video stream being provided to the electronic device 104. For example, the supplemental content may be overlaid onto the video stream, the video stream may be reduced in size to a smaller window within the supplemental content, and/or the video stream and the supplemental content may be combined in generally any manner. In order to combine the supplemental content with the video stream, the electronic device 102 may utilize a transcoding portion of a content processing pipeline that decodes the video stream, combines the supplemental content with the decoded video stream, and encodes the video stream including the supplemental content. In one or more implementations, the electronic device 104 may also utilize the transcoding portion of the content processing pipeline when the video stream is encoded in a format that is not decodable and/or not renderable by the electronic device 104 irrespective of whether any supplemental content is being added to the video stream.

However, if no supplemental content is being added to the video stream, and the video stream is encoded in a format that is decodable and renderable by the electronic device 104, the transcoding portion of the content processing pipeline may be unnecessary. The video stream transmitted by the electronic device 102 may be displayed such that the frames of the video stream encompass the entire screen, which may be referred to as a full screen mode. Thus, the electronic device 102 may power down the transcoding portion of the content processing pipeline and deliver the audio and/or video streams, without transcoding, to the electronic device 104, which may be referred to as non-transcoded streaming or non-transcoding streaming. In this manner, the electronic device 102 provides the audio and/or video streams to the electronic device 104 in the format and/or form that they are received and/or retrieved by the electronic device 102.

When a request for an action that utilizes transcoding is received, such as a user interface command to initiate a trick mode, display a menu, and/or display information regarding the content of the video stream, the electronic device 102 powers on the transcoding portion of the content processing pipeline and adaptively modifies the content processing pipeline to pass the video stream and/or audio stream through the transcoding portion. When the action has been completed, the electronic device 102 powers down the transcoding portion of the content processing pipeline and adaptively modifies the content processing pipeline such that the audio and/or video streams bypass the transcoding portion. The electronic device 102 provides control messages, or configuration messages, to the electronic device 104 to inform the electronic device 104 of any changes in the encoding of the audio and/or video streams as a result of modifying the content processing pipeline. The content processing pipeline is discussed in more detail below with respect to FIG. 2, and example processes of the electronic device 102 implementing the adaptive transcoding bypass system are discussed further below with respect to FIGS. 3 and 4.

Figure 2:
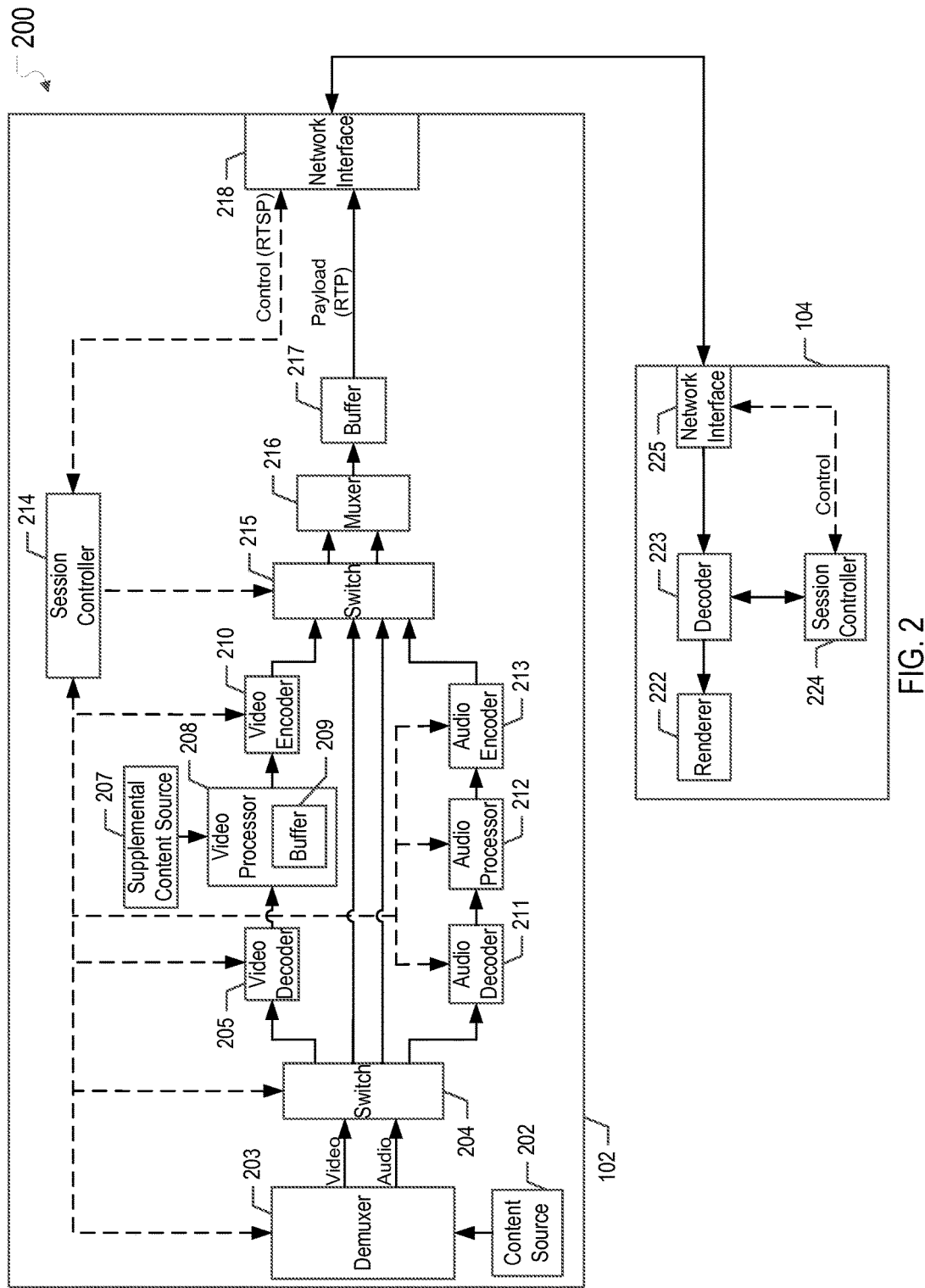
FIG. 2 illustrates an example network environment that includes an electronic (source) device in which audio and/or video streams may bypass a transcoding portion of a content processing pipeline in accordance with one or more implementations.

FIG. 2 illustrates an example network environment 200 that includes an electronic (source) device 102 in which audio and/or video streams may bypass a transcoding portion of a content processing pipeline in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the electronic devices 102, 104. For explanatory purposes, the network environment 200 is illustrated as including the electronic devices 102, 104 which are implementing a peer-to-peer screencasting, or an audio-video streaming, service, such as Miracast. However, the principles discussed with respect to the network environment 200 can be applied to any other audio and/or video streaming service and the principles can be applied to any of the other devices 106, 120, 124 of FIG. 1.

The electronic device 102 includes a content source 202, such as a memory storing downloaded, or generated content, a demultiplexer (demuxer) 203, a switch 204, a video decoder 205, a video processor 208 which includes a buffer 209, such as a dynamic random access memory (DRAM) screen buffer, a supplemental content source 207, such as a memory storing supplemental content, a video encoder 210, an audio decoder 211, an audio processor 212, an audio encoder 213, a switch 215, a multiplexer (muxer) 216, a buffer 217, a network interface 218, and a session controller 214. The pathway from the content source 202 to the buffer 217, and the components there-between, may be referred to as the content processing pipeline. One or more of the video decoder 205, video processor 208, the video encoder 210, the audio decoder 211, the audio processor 212, and/or the audio encoder 213 may be collectively referred to as the transcoding portion of the content processing pipeline. The electronic device 104 includes a renderer 222, a decoder 223, such as a H.265 decoder, a H.264 decoder, an MPEG-2 decoder, or any audio and/or video decoder, a session controller 224, and a network interface 225.

In one or more implementations, the electronic devices 102, 104 may utilize the network interfaces 218, 225 to establish a network connection directly with one another via a peer-to-peer connection, and/or to establish a network connection with one another over the network 108, e.g. in order to access and/or perform a service. The session controllers 214, 224 of the respective electronic devices 102, 104 transmit control information over the network 108 to configure the service, such as using the real-time streaming transport protocol (RTSP) over the transmission control protocol (TCP). The control information may include device capability negotiation, session maintenance information, and/or user commands that are relayed to the electronic device 102 by the electronic device 104. Once the electronic devices 102, 104 have completed device/service discovery and configuration, the electronic device 102 may begin providing a content stream to the electronic device 104.

For example, the content processing pipeline begins with the demuxer 203 retrieving a content stream from the content source 202, and demuxing the content stream. In one or more implementations, demuxing the content stream includes obtaining an audio stream and/or a video stream from the content stream. The demuxer 203 also parses program information (PI) from the audio and/or video streams and provides the program information to the session controller 214. The session controller 214 determines, based at least in part on received capabilities of the electronic device 104 and the received program information, whether the electronic device 104 can decode the audio and/or video streams. The session controller 214 may also determine whether any supplemental content is being added to the audio stream and/or video stream, such as based on application information.

The session controller 214 configures the switches 204, 215, such that the audio and/or video streams bypass the transcoding portion of the content processing pipeline when the electronic device 104 can decode the audio and/or video streams and there is no supplemental content, and such that the audio and/or video streams pass through the transcoding portion when the electronic device 104 cannot decode the audio and/or video streams, when supplemental content is being added, and/or when transcoding is otherwise being utilized. Thus, the session controller 214 configures the switch 204 to pass the audio and/or video streams directly to the switch 215 when the transcoding portion is being bypassed, and to pass the audio and/or video streams to the audio decoder 211 and video decoder 205, respectively, when the transcoding portion is not being bypassed. If the session controller 214 determines that the content stream is decodable by the electronic device 104, the session controller 214 transmits a configuration message to the session controller 224 of the electronic device 104 that indicates encoding attributes of the audio and/or video streams, such as the audio and/or video codecs, changing of the audio and/or video codecs, timing of switching between transcoded and non-transcoded, profiles, etc. The session controller 214 may also may power down the transcoding portion of the content processing pipeline, may power down portions of the content processing pipeline, may reduce the clock frequency of a transcoding processor, and/or may reduce the voltage of a transcoding processor, or utilize a low power mode for the transcoding portion, when the transcoding portion is being bypassed.

When the transcoding portion is being utilized, the video decoder 205 decodes the video stream and passes the video stream to the video processor 208. If supplemental content is being added to the video stream, such as a guide, graphical indicators associated with a trick mode, e.g. fast forward arrows, rewind arrows, a timeline, etc., information pertaining to the content of the video stream, such as a title, director, actors, topic, summary, electronic program guide, etc., the video processor 208 utilizes the buffer 209, such as a framebuffer and/or a screen buffer, to facilitate adding the supplemental content. The video processor 208 then passes the video stream to the video encoder 210, which encodes the video stream into a format that is decodable by the electronic device 104, and passes the encoded video stream to the switch 215. The audio decoder 211, the audio processor 212, and the audio encoder 213, operate in a similar fashion and provide the encoded audio stream to the switch 215. In one or more implementations, the audio processor 212 may add supplemental content to the audio stream, such as an alternative language audio track, audio commentary, audio user interface, audio feedback, etc.

The session controller 214 configures the switch 215 to receive the audio and/or video streams directly from the switch 204 when the transcoding portion is being bypassed and the switch 215 receives the audio and/or video streams from the audio encoder 213 and/or video encoder 210, respectively, when the transcoding portion is not being bypassed. In one or more implementations, the switch 215 is not configured by the session controller 214 and the switch 215 passes any audio and/or video streams that it receives, e.g. from the switch 204 or the video encoder 210 and the audio encoder 213, to the muxer 216. The muxer 216 muxes the audio and/or video streams together to form a muxed content stream and passes the content stream to the buffer 217 for transmission over the network interface 218 to the electronic device 104. The content stream is subsequently retrieved from the buffer and transmitted to the electronic device 104 over the network interface 218, such as using the real-time transport protocol (RTP) over user datagram protocol (UDP) or transmission control protocol (TCP), or any other network transmission protocol.

The electronic device 104 receives the content stream via the network interface 225, decodes the content stream with the decoder 223, renders the decoded content stream using the renderer 222, and outputs the rendered content. The electronic device 104 also receives user commands, such as via a remote control being interacted with by the user. The user commands may relate to the presentation of the content stream, such as trick modes, a request for a program guide, a request for additional information regarding the content of the stream, etc. The session controller 224 of the electronic device 104 relays the user commands to the session controller 214 of the electronic device 102. In one or more implementations, the electronic device 102 also receives user commands from a user interacting directly with the electronic device 102, such as via a user interface displayed on the electronic device 102 that is being used to control the presentation of the content on the electronic device 104. In the instance of a trick mode, the session controller 214 provides an indication of the trick mode to the demuxer 203, which modifies the audio and/or video streams to implement the indicated trick mode, e.g. drop frames, skip frames, repeat frames, interpolate frames, etc.

While the audio and/or video streaming service is being provided to the electronic device 104, the session controller 214 of the electronic device 102 continually assesses whether the content stream can bypass the transcoding portion of the content processing pipeline. If the session controller 214 determines that the content stream can no longer bypass the content processing pipeline, e.g. if a user command and/or request for an action is received that necessitates transcoding and/or adding supplemental content, the session controller 214 adaptively modifies the pathway of the content processing pipeline such that the content stream passes through the transcoding portion, e.g. via the switches 204, 215. In one or more implementations, the session controller 224 may transition the content stream to the transcoding portion when a transition point in the audio and/or video stream is identified by the demuxer 203. The transition point may be a random access point in the video stream, or another point in the audio and/or video stream where the video decoder 205 and/or the audio decoder 211 can begin decoding.

The session controller 214 also transmits a configuration message to the session controller 224 of the electronic device 104, via the network interface 218, to inform the session controller 224 that the content stream is being transcoded. The configuration message may include encoding parameters associated with the transcoding, such as codec information, resolution, frame rate, transport information, timing, transition timing, etc. The session controller 224 configures the decoder 223 based at least in part on the configuration message such that the decoder 223 can decode the transcoded content stream.

Similarly, when the requested action is completed, and/or the transcoding is no longer required, the session controller 214 of the electronic device 102 transitions the content processing pipeline, e.g. the switches 204, 215, such that the content stream bypasses the transcoding portion of the content processing pipeline. The session controller 214 again transmits a configuration message to the session controller 224 of the electronic device 104 to inform the session controller 224 that the content stream is no longer being transcoded. Example processes of the adaptive transcoding bypass system are discussed further below with respect to FIGS. 3 and 4.

In one or more implementations, one or more of the content source 202, the demuxer 203, the switch 204, the video decoder 205, the video processor 208, the buffer 209, the supplemental content source 207, the video encoder 210, the audio decoder 211, the audio processor 212, the audio encoder 213, the switch 215, the muxer 216, the buffer 217, the network interface 218, the session controller 214, the renderer 222, the decoder 223, the session controller 224, and/or the network interface 225 may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
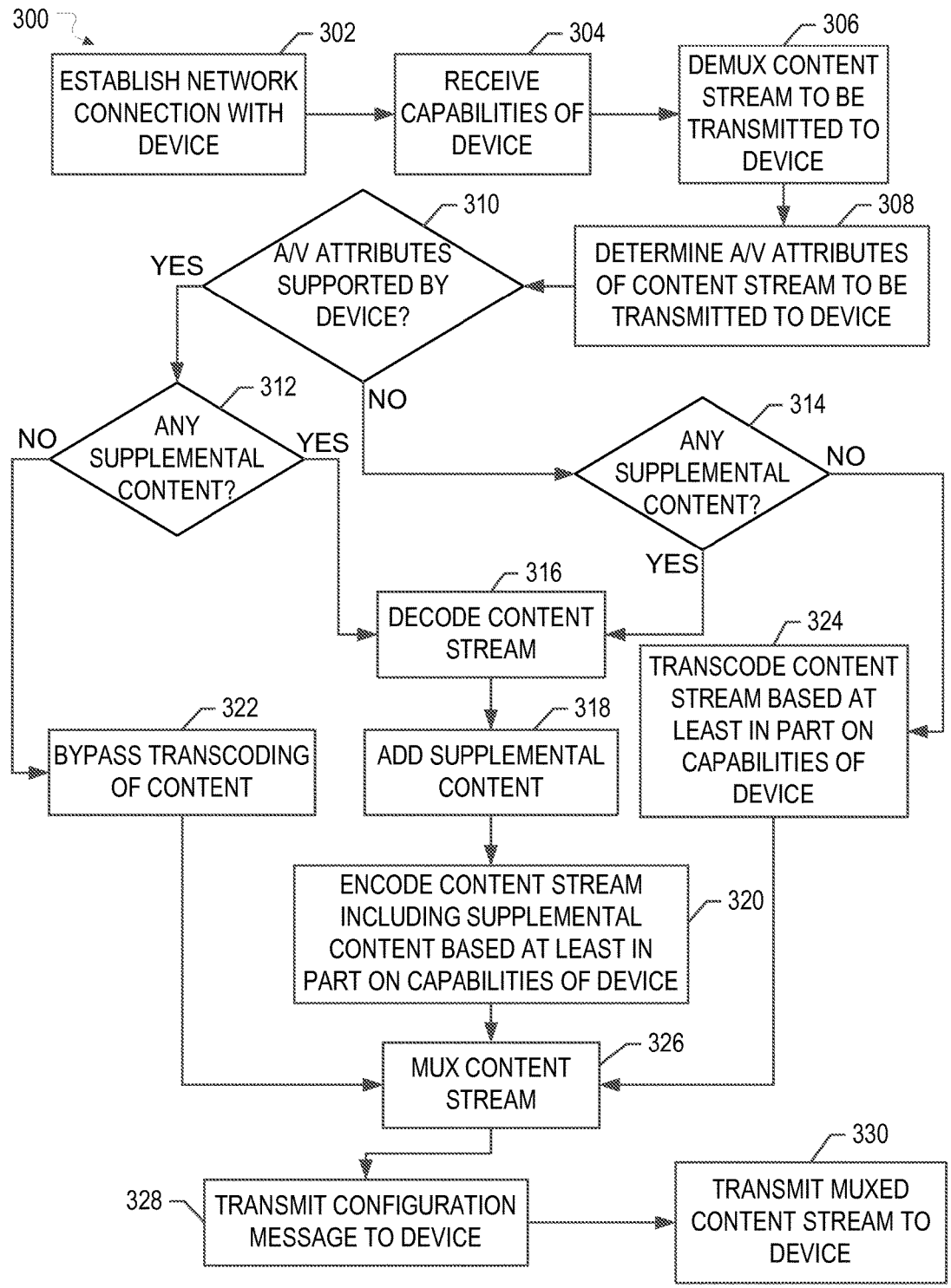
FIG. 3 illustrates a flow diagram of an example process of an electronic device implementing an adaptive transcoding bypass system in accordance with one or more implementations.

FIG. 3 illustrates a flow diagram of an example process 300 of an electronic device 102 implementing an adaptive transcoding bypass system in accordance with one or more implementations. For explanatory purposes, the example process 300 is primarily described herein with reference to the electronic device 102 of FIGS. 1-2; however, the example process 300 is not limited to the electronic device 102 of FIGS. 1-2, e.g. the example process 300 may be performed by one or more of the electronic devices 104, 106 and/or the set-top box device 120, and/or the example process 300 may be performed by one or more components of the electronic device 102, such as the session controller 214. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The electronic device 102 establishes a network connection with the electronic device 104, such as via a peer-to-peer network connection or a network connection via the network 108 (302). The electronic devices 102, 104 may implement a negotiation mechanism such that the electronic device 102 is configured to provide a content stream over the established network connection, e.g. as the source device, and the electronic device 104 is configured to receive the content stream over the established network connection, e.g. as the sink device. The electronic device 102 receives one or more capabilities of the electronic device 104 (304), such as encoding codecs, formats, and/or profiles that are supported by the electronic device 104. In one or more implementations, the one or more capabilities of the electronic device 104 may be requested by the electronic device 102 by transmitting an M4 RTSP GET_PARAMETER request, and, in response, may be communicated by the electronic device 104 by transmitting a M4 RTSP GET_PARAMETER response. The electronic device 102 obtains a content stream to be transmitted to the electronic device 104, such as from the content source 202, and demuxes the content stream into an audio and/or video stream, such as via the demuxer 203 (306).

The electronic device 102 determines one or more attributes of the audio and/or video streams, such as a codec, a profile, etc. (308). The electronic device 102 determines whether the one or more attributes of the audio and/or video streams are supported by the electronic device 104, such as based at least in part on the received capabilities of the electronic device 104 (304). For example, the electronic device 104 may determine whether encoding profiles of the audio and/or video streams are supported by the capabilities of the electronic device 104. If the attributes of the audio and/or video streams are supported by the electronic device 104, the electronic device 102 determines whether any supplemental content will be added to the content stream, such as one or more graphical overlays (312).

If the electronic device 102 determines that there is no supplemental content to add to the content stream (312), the electronic device 102 configures the pathway of the content processing pipeline such that the content stream bypasses the transcoding portion of the content processing pipeline (322). For example, the session controller 214 may configure the switch 204 to pass the audio and/or video streams directly to the switch 215, thereby bypassing the transcoding portion of the content processing pipeline. The switch 215 passes the audio and/or video streams to the muxer 216. The session controller 214 may also power down the components of the transcoding portion of the content processing pipeline, if they are not already powered down. For example, the transcoding portion of the content processing pipeline may be collectively coupled to a power supply via a power switch, and the session controller may modify the power switch such that the transcoding portion is disconnected from the power supply.

If the electronic device 102 determines that there is supplemental content to add to the content stream (312), the electronic device 102 configures the pathway of the content processing pipeline such that the content stream is passed through the transcoding portion, and the video decoder 205 receives and decodes the video stream (316). In one or more implementations, the audio decoder 211 also decodes the audio stream. The video processor 208 of the electronic device 102 adds the supplemental content, such as from the supplemental content source 207, to the video stream, such as by overlaying the supplemental content onto the video stream and/or otherwise combining at least a portion of the supplemental content and at least a portion of the video stream (318). In one or more implementations, the audio processor 212 also processes and/or adds supplemental content to, the audio stream.

The video encoder 210 of the electronic device 102 encodes the video stream, including the supplemental content, based at least in part on the received capabilities of the electronic device 104 (320) or the network capabilities. For example, the session controller 214 may instruct the video encoder 210 to encode the video stream, including the supplemental content, using a codec and/or profile that is supported by the electronic device 104. In one or more implementations, the audio encoder 213 encodes the audio stream based at least in part on the capabilities of the electronic device 104. The video stream output by the video encoder 210 and/or the audio stream output by the audio encoder 213 are passed to the switch 215, which has been configured, e.g. by the session controller 214, to provide the audio and/or video streams to the muxer 216.

If the electronic device 102 determines that the attributes of the audio and/or video streams are not supported by the electronic device 104 (310), the electronic device 102 configures the pathway of the content processing pipeline to pass the audio and/or video streams through the transcoding portion, and determines whether any supplemental content will be added to the content stream (314). If the electronic device 102 determines that supplemental content will be added to the content stream (314), the electronic device 102 performs (316)-(320) as discussed above. If the electronic device 102 determines that supplemental content will not be added to the content stream (314), the content stream is transcoded based at least in part on the capabilities of the electronic device 104, e.g. such that the transcoded content stream can be decoded by the electronic device 104 (324). For example, the audio and/or video streams may be decoded by the audio decoder 211 and/or video decoder 205, respectively, and then encoded by the audio encoder 213 and/or video encoder 210, respectively without adding any supplemental content. The video stream output by the video encoder 210 and/or the audio stream output by the audio encoder 213 are passed to the switch 215, which has been configured, e.g. by the session controller 214, to provide the audio and/or video streams to the muxer 216.

The muxer 216 muxes the audio and/or video streams received from either the audio encoder 213 and/or video encoder 210, or directly from the switch 204, to form a muxed content stream (326). Thus, irrespective of whether the audio and/or video streams bypassed the transcoding portion of the content processing pipeline, the audio and/or video streams are muxed by the muxer 216. In one or more implementations, a content stream from the content source 202 may be fed directly into the buffer 217, bypassing the demuxer 203 and the muxer 216. The electronic device 102 transmits a configuration message to the electronic device 104, such as via the session controller 214, that indicates one or more encoding attributes of the muxed content stream, such as an audio encoding profile, a video encoding profile, codec information, etc. (328). In one or more implementations, the configuration message may be an M4 SET_PARAMETER message. The electronic device 102 then transmits the content stream to the electronic device 104 via the network interface 218 and over the established network connection (330). The electronic device 102, e.g. via the session controller 214, continuously assesses whether the transcoding portion of the content processing pipeline can be bypassed, and adaptively modifies the content processing pipeline accordingly, as is discussed further below with respect to FIG. 4.

Figure 4:
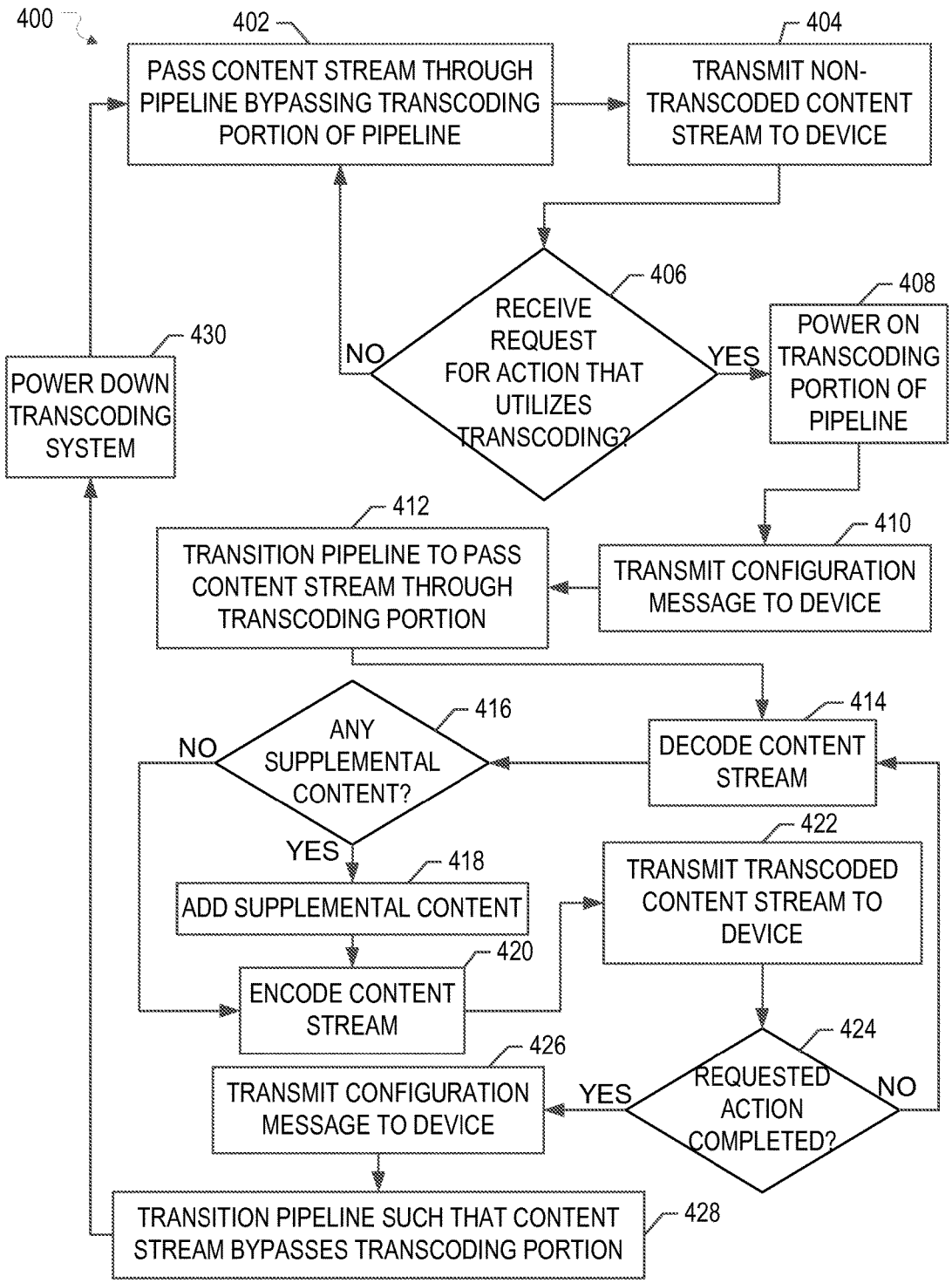
FIG. 4 illustrates a flow diagram of an example process of an electronic device implementing an adaptive transcoding bypass system in accordance with one or more implementations.

FIG. 4 illustrates a flow diagram of an example process 400 of an electronic device 102 implementing an adaptive transcoding bypass system in accordance with one or more implementations. For explanatory purposes, the example process 400 is primarily described herein with reference to the electronic device 102 of FIGS. 1-2; however, the example process 400 is not limited to the electronic device 102 of FIGS. 1-2, e.g. the example process 400 may be performed by one or more of the electronic devices 104, 106 and/or the set-top box device 120, and/or the example process 400 may be performed by one or more components of the electronic device 102, such as the session controller 214. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The electronic device 102 passes the content stream, e.g. the audio and/or video streams, through the content processing pipeline bypassing the transcoding portion of the content processing pipeline (402). For example, the electronic device may determine in FIG. 3 that the transcoding portion can be bypassed and powered down, or placed into a low power mode. The electronic device 102 transmits the non-transcoded content stream (bypassing the transcoding portion) to the electronic device 104 over the established network connection (404). The electronic device 102 determines whether a request for an action that utilizes transcoding has been received (406). In one or more implementations, the request may relate to a user interface command, such as a request for a trick mode or a request for supplemental content. In one or more implementations, the request may be related to a determination at the electronic device 102 and/or the electronic device 104 that the content stream should be transcoded into a different form, such as a different profile. For example, if the bandwidth and/or quality of the network connection between the electronic devices 102, 104 fluctuates, and/or if the electronic device 104 needs to conserve power, one or more of the electronic devices 102, 104 may determine that the content stream should be transcoded, such as to a lower quality profile.

If the electronic device 102 determines that a request for an action that utilizes transcoding has not been received (406), the electronic device 102 continues to pass the content stream through the content processing pipeline with the transcoding portion being bypassed (402). If the electronic device 102 determines that a request for an action that utilizes transcoding has been received (406), the electronic device 102 powers on the transcoding portion of the content processing pipeline, if the transcoding portion is not already powered on (408). In one or more implementations, the session controller 214 transmits a command, such as a wake command, to one or more of the video decoder 205, the video processor 208, the video encoder 210, the audio decoder 211, the audio processor 212, and/or the audio encoder 213.

The electronic device 102, such as via the session controller 214, transmits a configuration message to the electronic device 104 that indicates that the content stream will be transcoded and includes one or more encoding characteristics of the transcoded content stream (410). For example, the encoding characteristics may indicate a codec, a bit rate, a resolution, encoding parameters, an encoding profile, or generally any information that may be used by the electronic device 104 to decode the transcoded content stream.

The electronic device 102 transitions the content processing pipeline such that the content stream passes through the transcoding portion of the content processing pipeline (412), such as in the manner discussed above with respect to FIG. 3. The video decoder 205 receives and decodes the video stream (414). In one or more implementations, the audio decoder 211 also decodes the audio stream. The electronic device 102 determines whether there is any supplemental content to add to the content stream, such as via the video processor 208 and/or the session controller 214 (416). If there is supplemental content to add to the content stream (416), the video processor 208 adds the supplemental content to the video stream, such as from the supplemental content source 207 (418). In one or more implementations, the audio processor 212 also processes and/or adds supplemental content to, the audio stream.

The video encoder 210 of the electronic device 102 encodes the video stream, including any supplemental content, based at least in part on the received capabilities of the electronic device 104, and as was indicated in the configuration message transmitted to the electronic device 104 (420). In one or more implementations, the audio encoder 213 also encodes the audio stream. The video stream output by the video encoder 210 and/or the audio stream output by the audio encoder 213 are passed to the switch 215, which has been configured, e.g. by the session controller 214, to provide the audio and/or video streams to the muxer 216. The muxer 216 muxes the transcoded audio and/or video streams to produce a transcoded content stream which is transmitted to the electronic device 104, such as via the established network connection (422).

The electronic device 102 determines whether the requested action has been completed, and/or whether the transcoding portion of the content processing pipeline is no longer necessary (424). If the electronic device 102 determines that the requested action has not been completed, and/or that the transcoding portion of the content processing pipeline is still necessary (424), the electronic device 102 continues to perform (414)-(422). If the electronic device 102 determines that the requested action has been completed, such as a trick mode has been completed and/or a menu or guide has been exited (424), the electronic device 102 transmits a configuration message to the electronic device 104 to indicate the encoding characteristics of the non-transcoded content stream (426).

The electronic device 102 then transitions the content processing pipeline such that the content stream bypasses the transcoding portion (428). For example, the session controller 214 may configure one or more of the switches 204, 215 to cause the audio and/or video streams to bypass the content processing pipeline. The electronic device 102 powers down the transcoding portion and/or causes the transcoding portion to enter a low power mode (430). In one or more implementations, the session controller 214 transmits a command, such as a sleep command, to one or more of the video decoder 205, the video processor 208, the video encoder 210, the audio decoder 211, the audio processor 212, and/or the audio encoder 213. The electronic device 102 then resumes passing the content stream through the content processing pipeline bypassing the transcoding portion (402), and transmitting the non-transcoded content stream to the electronic device 104 (404).

Figure 5:
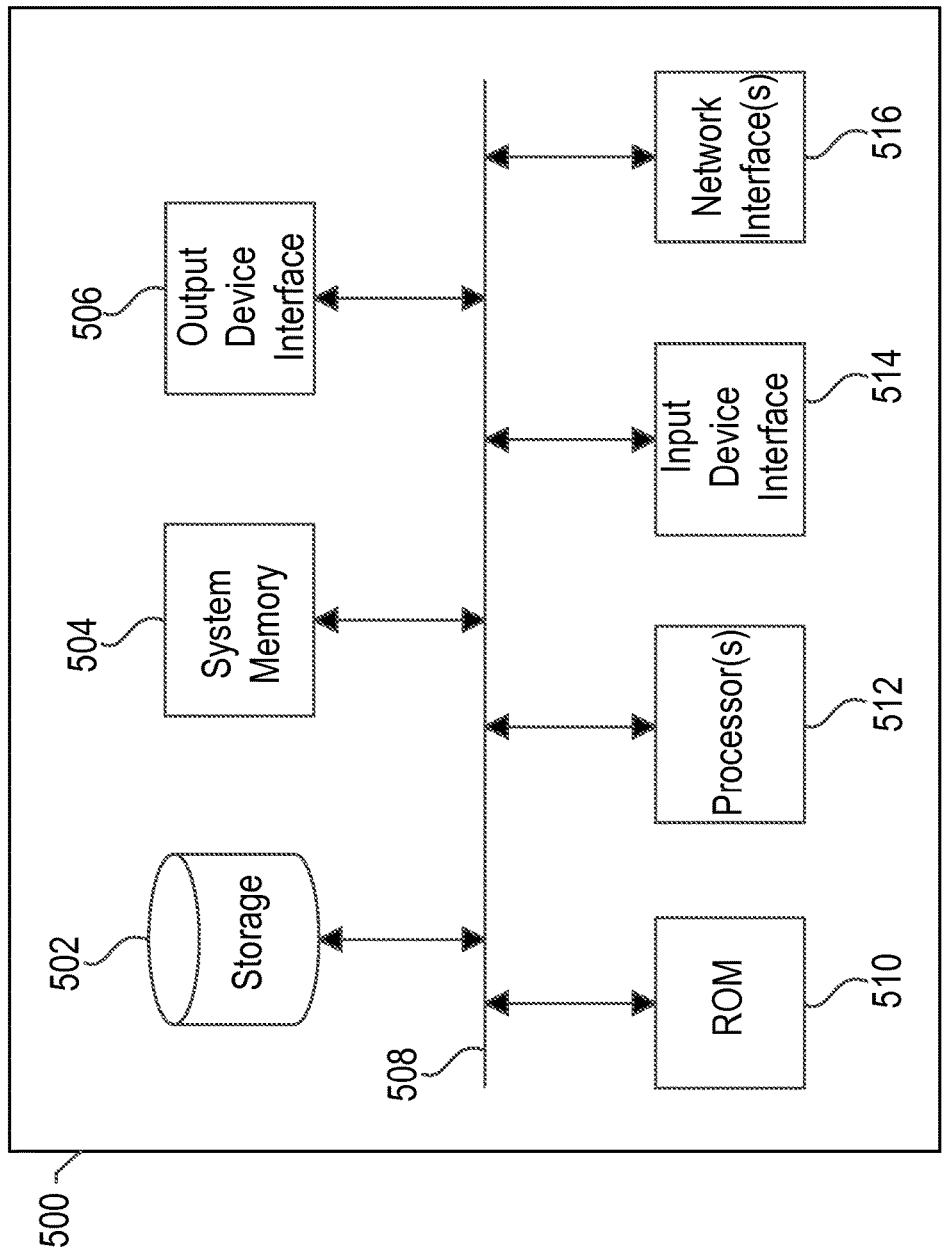
FIG. 5 conceptually illustrates an example electronic system with which one or more implementations of the subject technology can be implemented.

FIG. 5 conceptually illustrates an example electronic system 500 with which one or more implementations of the subject technology can be implemented. The electronic system 500, for example, may be, or may include, one or more of the electronic devices 102, 104, 106, the output device 124, and/or the set-top box device 120, one or more wearable devices, a desktop computer, a laptop computer, a tablet device, a phone, and/or generally any electronic device. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include Bluetooth interface, a Bluetooth low energy (BLE) interface, a Zigbee interface, an Ethernet interface, a Wi-Fi interface, a MoCA interface, a HomePlug interface, a reduced gigabit media independent interface (RGMII), or generally any interface for connecting to a network. In this manner, electronic system 500 can be a part of one or more networks of computers (such as a local area network (LAN), a personal area network (PAN), a peer-to-peer network (P2P), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   identifying a content stream for transmission to a device over a network connection established with the device;
   determining whether an encoding attribute of the content stream is supported by the device based at least in part on at least one capability of the device;
   when the encoding attribute of the content stream is supported by the device:
      transmitting a first configuration message to the device over the network connection prior to transmitting the content stream, the first configuration message comprising first information for decoding the content stream;
      passing the content stream through a content processing pipeline bypassing a transcoding portion of the content processing pipeline; and
      transmitting the content stream to the device over the network connection, wherein the first configuration message comprises first information for decoding the content stream; and
   when a change in the encoding attribute results in the encoding attribute not being supported by the device:
      passing the content stream through the content processing pipeline including the transcoding portion of the content processing pipeline to produce a transcoded content stream;
      transmitting a second configuration message to the device over the network connection prior to transmitting the transcoded content stream, the second configuration message comprising second information for decoding the transcoded content stream and transition information corresponding to transitioning from decoding the content stream using the first information to decoding the transcoded content stream using the second information; and
      transmitting the transcoded content stream to the device over the network connection.

2. The method of claim 1, further comprising:
   receiving the at least one capability of the device from the device over the network connection.

3. The method of claim 1, wherein the content stream comprises a video stream and an audio stream, and the method further comprises:

demuxing the content stream to obtain the video stream and the audio stream;
passing the video stream and the audio stream through the content processing pipeline; and
muxing the video stream and the audio stream at an end of the content processing pipeline.

4. The method of claim 3, wherein the encoding attribute of the content stream comprises at least one of a video encoding format associated with the video stream, or an audio encoding format associated with the audio stream.

5. The method of claim 4, wherein determining whether the encoding attribute of the content stream is supported by the device based at least in part on the at least one capability of the device comprises determining whether the device can decode at least one of the video stream encoded in the video encoding format or the audio stream encoded in the audio encoding format.

6. The method of claim 4, wherein the first configuration message indicates at least one of the video encoding format or the audio encoding format associated with the content stream.

7. The method of claim 1, further comprising:
when the encoding attribute of the content stream is supported by the device:
determining whether supplemental content will be added to the content stream in the content processing pipeline;
when the supplemental content will be added to the content stream, passing the content stream through the content processing pipeline including the transcoding portion of the content processing pipeline; and
when the supplemental content will not be added to the content stream, powering down the transcoding portion of the content processing pipeline and passing the content stream through the content processing pipeline bypassing the powered down transcoding portion.

8. The method of claim 1, further comprising:
establishing the network connection with the device, wherein the network connection comprises a peer-to-peer network connection with the device or an infrastructure network connection with the device.

9. The method of claim 1, wherein the transcoding portion of the content processing pipeline is being bypassed, and the method further comprises:
receiving a request for an action that utilizes the transcoding portion of the content processing pipeline;
powering on the transcoding portion of the content processing pipeline;
transitioning the content processing pipeline to pass the content stream through the transcoding portion of the content processing pipeline;
adding any supplemental content to the content stream and encoding the content stream via the content processing pipeline;
transmitting the second configuration message to the device over the network connection, wherein the second configuration message comprises the second information for decoding the transcoded content stream including any supplemental content; and
transmitting the transcoded content stream including any supplemental content to the device over the network connection.

10. The method of claim 9, the method further comprising:
determining that the action has completed;
transitioning the content processing pipeline so that the content stream bypasses the transcoding portion of the content processing pipeline;
powering down the transcoding portion of the content processing pipeline;
transmitting a third configuration message to the device over the network connection, wherein the third configuration message comprises the first information for decoding the content stream; and
transmitting the content stream to the device over the network connection.

11. The method of claim 9, wherein the action comprises displaying an overlay on top of the content stream, and the supplemental content comprises the overlay.

12. The method of claim 11, wherein the overlay comprises at least one of a guide, a menu, or a visual indication associated with performing a trick mode.

13. A device comprising:
at least one processor circuit configured to:
pass a content stream through a content processing pipeline bypassing a powered-down transcoding portion of the content processing pipeline;
transmit, to a sink device, a first configuration message that comprises first information for decoding the content stream, prior to transmission of the content stream;
transmit the content stream to the sink device, via a network connection, for display;
receive, from the sink device via the network connection, a first request for display of supplemental content;
power on the transcoding portion of the content processing pipeline and transition a pathway through the content processing pipeline to pass the content stream through the transcoding portion of the content processing pipeline;
add the supplemental content to the content stream and encode the content stream via the transcoding portion of the content processing pipeline to produce a transcoded content stream, including any supplemental content;
transmit, to the sink device, a second configuration message that comprises second information for decoding the transcoded content stream, prior to transmission of the transcoded content stream, the second configuration message further comprising transition information indicating a time to transition from decoding the content stream using the first information to decoding the transcoded content stream using the second information; and
transmit the transcoded content stream, including the supplemental content, to the sink device, via the network connection, for display.

14. The device of claim 13, wherein the first request for display of the supplemental content comprises a user interface request received by the sink device or received by the device.

15. The device of claim 13, wherein the at least one processor circuit is further configured to:
adjust a switch to transition the pathway through the content processing pipeline.

16. The device of claim 13, wherein the at least one processor circuit is further configured to:
determine that display of the supplemental content has stopped;

transition the pathway through the content processing pipeline to cause the content stream to bypass the transcoding portion of the content processing pipeline;

power down the transcoding portion of the content processing pipeline; and resume transmission of the content stream to the sink device, via the network connection, for display.

17. A computer program product comprising instructions stored in a tangible computer-readable storage medium, the instructions comprising:

instructions to obtain a content stream for transmission to a sink device that is connected via a network connection;

instructions to determine whether any actions that utilize transcoding have been requested with respect to the content stream;

instructions to process the content stream via a content processing pipeline, wherein a transcoding portion of the content processing pipeline is bypassed when information is received that indicates that the sink device can decode the content stream, and no actions that utilize transcoding have been requested;

instructions to transmit, to the sink device, a first configuration message that comprises first information for decoding the content stream or a transcoded content stream prior to transmission of the content stream or the transcoded content stream;

instructions to transmit the content stream or the transcoded content stream to the sink device via the network connection with the sink device;

instructions to adaptively modify the content processing pipeline to cause the content stream to pass through the transcoding portion when the transcoding portion is being bypassed and one of the actions that utilizes transcoding is requested with respect to the content stream; and instructions to transmit, to the sink device, a second configuration message that comprises second information for decoding the transcoded content stream prior to transmission of the transcoded content stream when the content processing pipeline is adaptively modified, the second configuration message further comprising transition information corresponding to transitioning from decoding the content stream using the first information to decoding the transcoded content stream using the second information.

18. The computer program product of claim 17, wherein the first configuration message comprises one or more encoding attributes of the content stream including at least one of an audio encoding profile, a video encoding profile, or codec information, and the second configuration message comprises one or more encoding parameters associated with the transcoding portion including at least one of: codec information, resolution, frame rate, transport information, timing information, or the transition information.

19. The computer program product of claim 17, wherein the instructions to adaptively modify the content processing pipeline comprises:

instructions to reduce power consumption of the transcoding portion of the content processing pipeline; and instructions to modify a pathway of the content processing pipeline such that the content stream passes through the transcoding portion.

* * * * *